(12) United States Patent
Castillo et al.

(10) Patent No.: US 11,926,789 B2
(45) Date of Patent: Mar. 12, 2024

(54) ADDITIVES FOR WELLBORE CLEANING AND FLUID DISPLACEMENT

(71) Applicant: Baker Hughes Oilfield Operations LLC, Houston, TX (US)

(72) Inventors: Dorianne Castillo, Houston, TX (US); Erna Kakadjian, The Woodlands, TX (US); Saniya Syed, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/383,267

(22) Filed: Jul. 22, 2021

(65) Prior Publication Data
US 2023/0022139 A1 Jan. 26, 2023

(51) Int. Cl.
  *C09K 8/524* (2006.01)
  *C09K 8/035* (2006.01)
  *C09K 8/536* (2006.01)

(52) U.S. Cl.
  CPC .............. *C09K 8/524* (2013.01); *C09K 8/035* (2013.01); *C09K 8/536* (2013.01); *C09K 2208/30* (2013.01)

(58) Field of Classification Search
  CPC ........ C09K 8/524; C09K 8/035; C09K 8/602; C09K 8/604
  See application file for complete search history.

(56) References Cited

U.S. PATENT DOCUMENTS

| | | | |
|---|---|---|---|
| 7,207,387 | B2 | 4/2007 | Eoff et al. |
| 7,902,123 | B2 | 3/2011 | Harrison et al. |
| 8,584,760 | B2 | 11/2013 | Arvie, Jr. et al. |
| 9,222,013 | B1 | 12/2015 | Champagne et al. |
| 2004/0014609 | A1 | 1/2004 | Dalmazzone et al. |
| 2005/0113264 | A1* | 5/2005 | Vollmer .............. C09K 8/12 507/211 |
| 2010/0263863 | A1 | 10/2010 | Quintero et al. |
| 2010/0317560 | A1 | 12/2010 | Ryther et al. |
| 2011/0272160 | A1 | 11/2011 | Arvie, Jr. et al. |
| 2013/0137611 | A1 | 5/2013 | Pierce et al. |
| 2014/0374112 | A1 | 12/2014 | Hutchings et al. |
| 2015/0080273 | A1* | 3/2015 | Hatchman .............. C10G 33/04 516/29 |
| 2015/0126418 | A1* | 5/2015 | Fluck .................. C09K 8/68 507/260 |
| 2016/0102239 | A1 | 4/2016 | Pietrangeli et al. |
| 2017/0158943 | A1 | 6/2017 | Akaighe et al. |
| 2017/0335179 | A1* | 11/2017 | Ngantung ............ C09K 8/524 |

FOREIGN PATENT DOCUMENTS

| | | |
|---|---|---|
| CA | 2891278 A1 | 11/2015 |
| EP | 0692021 A1 | 1/1996 |
| EP | 0853651 A4 | 12/1998 |
| EP | 2427537 A1 | 3/2012 |
| EP | 2649173 A2 | 10/2013 |
| EP | 0289529 B1 | 1/2019 |
| WO | 201201601 A3 | 1/2012 |
| WO | 2013149122 A1 | 10/2013 |
| WO | 2016011015 A1 | 1/2016 |

OTHER PUBLICATIONS

Brine Fluids, GEO Drilling fluids, Inc., 2013 (Year: 2013).*

* cited by examiner

*Primary Examiner* — Aiqun Li
(74) *Attorney, Agent, or Firm* — Crowe & Dunlevy, P.C.

(57) ABSTRACT

A brine-based viscosified pill including (1) a viscosified brine, (2) a surfactant-solvent blend containing about 5 wt. % to about 40 wt. % of at least one nonionic surfactant; about 5 wt. % to about 20 wt. % of at least one polyglycerol ester, about 20 wt. % to about 60 wt. % of at least one co-solvent; about 20 wt. % to about 25 wt. % water; and optionally about 1 wt. % to about 15 wt. % of at least one hydrophobic solvent, and (3) no solid weighting agent, may be introduced to a wellbore in an effective amount to clean the wellbore or displace fluid in the wellbore at a wide range of temperatures.

4 Claims, No Drawings

ADDITIVES FOR WELLBORE CLEANING AND FLUID DISPLACEMENT

TECHNICAL FIELD

The present invention relates to additives for wellbore cleaning and fluid displacement, and more particularly relates to use of a brine-based viscosified pill containing no solid weighting agent for wellbore cleaning and drilling fluid displacement.

BACKGROUND

In the drilling and completion of subterranean oil and gas wells, once a drilling operation has been conducted, the well is then prepared for production operations, which often involves cleaning the wellbore with various additives that aid in removing or displacing the oil-based drilling fluid, also known as oil-based drilling muds ("OBM") or simply "muds," that was used to create the borehole that forms the wellbore before introducing a completion fluid comprising a brine into the wellbore to facilitate operations prior to initiation of production.

Additives that are effective for wellbore cleaning, including pipeline cleaning and completion displacements, must be dense enough to properly displace OBM and must be able to work in onshore, offshore, and deep-water environments, which all have varying temperature and salinity profiles.

However, most additives for such wellbore cleaning include some kind of additional solid weighting agent that creates more material waste post-use. Other additives used for completion displacements or well cleaning are comprised of agents that pose environmental or health risks, such as acids and hazardous solvents like xylene.

Therefore, there is a need for developing a wellbore cleaning and displacement additive that involves less materials, that poses little or no hazard to the environment or people's heath, and that can work to clean wellbores and displace OBM in all upstream environments (i.e. in a wide range of temperatures and salinities).

SUMMARY

There is provided, in one non-limiting form, a method for cleaning a wellbore or displacing fluid in a wellbore in which a brine-based viscosified pill that includes a viscosified brine and surfactant-solvent blend and no solid weighting agent is introduced to a wellbore in an amount effective to clean the wellbore or displace fluid in the wellbore, such as an oil-based drilling fluid. In one non-restrictive embodiment, the solvent-surfactant blend comprises about 5 wt. % to about 40 wt. % at least one nonionic surfactant; about 5 wt. % to about 20 wt. % of at least one polyglycerol ester, about 20 wt. % to about 60 wt. % at least one co-solvent; about 20 wt. % to about 25 wt. % water; and optionally about 1 wt. % to about 15 wt. % at least one hydrophobic solvent.

There is further provided in another non-limiting form, a solid weighting agent-free, brine-based viscosified pill formulation that includes about 80 vol. % to about 95 vol. % viscosified brine and about 5 vol. % to about 20 vol. % of the surfactant-solvent blend having the composition recited above, where, in one non-exclusive embodiment, the pill is used to displace an oil-based drilling fluid and the viscosified brine has a density from about 9 pounds per gallon ("ppg") to about 19.2 ppg and a yield point that about 1.5 to about 2 times greater than the yield point of the oil-based drilling fluid.

DETAILED DESCRIPTION

It has been discovered that an effective amount of a brine-based viscosified pill comprising a viscosified brine and surfactant-solvent blend and no solid weighting agent may be introduced to a wellbore to clean the wellbore or displace fluid from the wellbore.

In one non-limiting embodiment, the brine-based viscosified pill containing no solid weighting agent has about 5 vol. % to about 20 vol. % of a surfactant-solvent blend that comprises:

about 5 wt. % to about 40 wt. % of at least one non-ionic surfactant;
about 5 wt. % to about 20 wt. % of at least one polyglycerol ester;
about 20 wt. % to about 60 wt. % of at least one co-solvent;
about 20 wt. % to about 25 wt. % water; and
optionally about 1 wt. % to about 15 wt. % of at least one hydrophobic solvent.

Suitable non-ionic surfactants include, but are not limited to, alkyl poly glycosides, alcohol ethoxylates, polyglycerol alkyl ethers, polyglycols, glucosyl dialkyl ethers, ester-linked surfactants, polyoxyethylene alkyl ethers, sorbitan esters, polysorbates, surfactin, EO/PO block co-polymers, and combinations thereof. Surfactin is a bacterial cyclic lipopeptide. Co-solvents useful in the blend include, but are not limited to, 2-butoxyethanol, glycol ethers (including, but not necessarily limited to dipropylene glycol methyl ether), propylidene glycerol, butanol, butoxytriglycol, and combinations thereof. In one non-limiting embodiment the surfactant or co-solvent does not include or has an absence of a propionate. To the extent included in the blend, the hydrophobic solvent may be, without limitation, dibasic ester, olefinic ester, and mixtures thereof.

In one non-restrictive embodiment, the brine-based viscosified pill containing no solid weighting agent contains about 80 vol. % to about 95 vol. % of viscosified brine. The viscosified brine may be formed by mixing a brine having a density ranging from about 9 pounds per gallon ("ppg") to about 19.2 ppg with a viscosifier such as, for example, guar gum, xanthan gum polysaccharide hydrophilic polymer (guar gum), diallyldimethylammonium chloride polymer (polyDAD-MAC), hydroxyethyl cellulose (HEC), one or more viscoelastic surfactants, and combinations thereof. The viscosity of the brine depends on the viscosity of the mud/drilling fluid. In general, it is not possible to set a minimum or maximum viscosity for all cases. YP refers to yield point, and the viscosified brine has a YP that is about 1.5 to about 2 times greater than the YP of the oil-based drilling fluid, in one non-limiting embodiment. The mud should not have a YP of zero. In one non-limiting embodiment, the brine-based viscosified pill should have a YP no lower than 10.

The brine to be viscosified may comprise a salt selected from a group consisting of: NaCl, NaBr, $CaCl_2$, $CaBr_2$, $ZnBr_2/CaCl_2$, KCl, and combinations thereof or a salt selected from a group consisting of HCOOCs (cesium formate), HCOONa (sodium formate), HCOOK (potassium formate), and combinations thereof. The brine to be viscosified may be saturated or unsaturated. The salinity of the brine to be viscosified may range from about 3.5% to about 53.6%.

The brine-based viscosified pill with no solid weighting agent, in one embodiment, may be used to clean a wellbore. In another embodiment, the brine-based viscosified pill with no solid weighting agent may be used to displace or remove a fluid from a wellbore. The temperature of the fluid or temperature of the wellbore may range from about 40° F. to about 350° F. The fluid to be displaced or removed may be an oil-based drilling fluid. The different types of oil-based drilling fluids that may be displaced or removed include, but are not limited to, synthetic oil-based drilling fluid, a mineral oil-based drilling fluid, and a diesel-based drilling fluid. In one non-limiting embodiment, the viscosified brine in the brine-based viscosified pill used to clean a wellbore or displace or remove fluid in a wellbore has a yield point that is about 1.5 to about 2 times the yield point of the oil-based drilling fluid.

The amount of the brine-based viscosified pill with no solid weighting agent introduced or applied to the wellbore for effective cleaning or fluid displacement or removal is sized at 10 volume % of the hole volume with pipe, maintaining a viscosity profile in laminar flow greater than that of the drilling fluid and by-products of blending with the drilling fluid.

In yet another non-limiting embodiment, the cleaning of the wellbore or the displacing or removing of the fluid is accomplished by introducing a second pill into the wellbore after the brine-based viscosified pill with no solid weighting agent is introduced to the wellbore. This second pill may comprise any of the following: a surfactant in water or a non-viscosified brine, a surfactant-solvent blend of kind described above in water or a non-viscosified brine, and a phosphate buffer agent in non-viscosified brine. The second cleaning pill is designed to have the surfactant or surfactant-solvent blend in 5 to 20% by vol., with 10 minute contact time in the largest annulus of the well when pumping at recommended rates. This time period should be understood as merely one representative time period, and the time period is not necessarily limited to 10 minutes.

The brine-based viscosified pill and second cleaning pill, could be followed by a viscosified tail spacer comprising drill water or brine, and viscosifier such as, for example, xanthan gum, polysaccharide hydrophilic polymer, guar gum, or hydroxyl ethyl cellulose.

It is not an intention or a goal of the method described herein to form a microemulsion. In other words and in a non-restrictive version, the method for cleaning a wellbore and/or displacing fluid in a wellbore is practiced in the absence of the formation of a microemulsion or in the absence of intentional formation of a microemulsion. Furthermore, the surfactant-solvent blend is not a microemulsion, in another non-limiting embodiment.

The invention will be further described with respect to the following Examples, which are not meant to limit the invention, but rather to further illustrate some embodiments.

EXAMPLES

A sleeve test procedure used (1) several different viscosified brine-based pills containing no solid weighting agents, containing four different formulations of surfactant-solvent blend in amounts ranging from 5 vol. % to about 10 vol. %, and containing various high density, viscosified brines (both unsaturated and saturated) and (2) several non-viscosified brine pills containing either a surfactant-solvent blend or a phosphate buffer to see the cleaning/displacement efficiency of these pills at 10-, 5- or 1-minute contact times with oil-based muds having temperatures of 40° F. and 120° F.

Each brine-based viscosified pill tested contains one of the four surfactant-solvent formulations in Table 1.

TABLE 1

Surfactant-Solvent Blend Formulations Tested

| Formulation A | Percentage (wt. %) | Chemistry |
|---|---|---|
| | 18.5% | alkyl poly glycosides non-ionic surfactants |
| | 6.2% | polyglycerol ester |
| | 15.0% | Hydrophobic solvent dibasic esters mix |
| | 39.5% | 2-butoxyethanol |
| | 20.6% | water |

| Formulation B | Percentage (wt. %) | Chemistry |
|---|---|---|
| | 10.2% | alkyl poly glycosides non-ionic surfactant |
| | 5.2% | polyglycerol ester |
| | 5.2% | EO/PO block co-polymer non-ionic surfactant |
| | 55.0% | 2-butoxyethanol |
| | 24.4% | water |

| Formulation D | Percentage (wt. %) | Chemistry |
|---|---|---|
| | 18.5% | alkyl poly glycosides non-ionic surfactants |
| | 6.2% | polyglycerol ester |
| | 15.0% | Hydrophobic solvent (olefinic ester) |
| | 39.5% | 2-butoxyethanol |
| | 20.6% | water |

| Formulation C | Percentage (wt. %) | Chemistry |
|---|---|---|
| | 15.3% | polyglycerol ester |
| | 37.1% | alkyl poly glycosides non-ionic surfactants |
| | 25.4% | 2-butoxyethanol |
| | 22.8% | water |

The test results for each sleeve test are set forth in Tables 2, 3, 4, 5, and 6:

TABLE 2

Sleeve Test to Clean Oil-Based Muds with $CaCl_2/CaBr_2$ (12.2 ppg) Brine Viscosified Pill with 10 vol. % Surfactant-Solvent Blend and a Non-viscosified Brine Pill with 7.5 vol. % Phosphate Buffer Agent at 5-minute Contact Times

| | Surfactant-Solvent Blend used | | | |
|---|---|---|---|---|
| | Sleeve Test to clean Mineral Oil Based Mud | | Sleeve Test to clean Synthetic Oil Based Field Mud | |
| Name | Percentage Cleaning at 40° F. | Percentage Cleaning at 120° F. | Percentage Cleaning at 40° F. | Percentage Cleaning at 120° F. |
| Formulation A | 97 | 96 | 85 | 99 |
| Formulation B | 99 | 84 | 100 | 100 |
| Formulation C | 99 | 99 | 82 | 98 |
| Formulation D | 98 | 97 | 73 | 100 |

TABLE 3

Sleeve Test to Clean Synthetic Oil-Based Field
Mud with NaCl (10 ppg) Brine Viscosified Pill
with 5 vol. % Surfactant-Solvent Blend and a
Non-viscosified Brine Pill with 5 vol. %
Phosphate Buffer Agent at 1-minute Contact Times

| | Surfactant-Solvent Blend used | |
| --- | --- | --- |
| Name | Percentage Cleaning at 40° F. | Percentage Cleaning at 120° F. |
| Formulation A | 86 | 95 |
| Formulation D | 82 | 98 |

TABLE 4

Sleeve Test to Clean Mineral Oil-Based Field
Mud with NaCl (10 ppg) Brine Viscosified Pill with 5
vol. % Surfactant-Solvent Blend and a Non-viscosified
Brine Pill with 5 vol. % Phosphate Buffer
Agent at 1-minute Contact Times

| | Surfactant-Solvent Blend used | |
| --- | --- | --- |
| Name | Percentage Cleaning at 40° F. | Percentage Cleaning at 120° F. |
| Formulation A | 82 | 52 |
| Formulation B | 58 | 85 |
| Formulation C | 86 | 81 |
| Formulation D | 86 | 76 |

TABLE 5

Sleeve Test to Clean Mineral Oil Based Mud with
NaBr (12.2 ppg) Brine Viscosified Pill with 10 vol. %
Surfactant-Solvent Blend and a Non-viscosified Brine
Pill with 7.5 vol. % Phosphate Buffer Agent
at 5-minute Contact Times

| | Surfactant-Solvent Blend used | |
| --- | --- | --- |
| Name | Percentage Cleaning at 40° F. | Percentage Cleaning at 120° F. |
| Formulation A | 99 | 100 |
| Formulation B | 97 | 98 |
| Formulation C | 95 | 94 |
| Formulation D | 100 | 93 |

TABLE 6

Sleeve Test to Clean Oil-Based North Sea Field Mud with
CaCl$_2$/CaBr$_2$ (12.2 ppg) Brine Viscosified Pill with
5 vol. % Surfactant-Solvent Blend and a Non-
viscosified Brine Pill with 5 vol. % Surfactant-Solvent
Blend at 1-minute Contact Times

| | Surfactant-Solvent Blend used | | | |
| --- | --- | --- | --- | --- |
| | Sleeve Test to clean Mineral Oil Based North Sea Field Mud | | Sleeve Test to clean Synthetic Oil Based Field Mud | |
| Name | Percentage Cleaning at 40° F. | Percentage Cleaning at 120° F. | Percentage Cleaning at 40° F. | Percentage Cleaning at 120° F. |
| Formulation A | 92 | 95 | 87 | 96 |
| Formulation B | 91 | 96 | 91 | 71 |

TABLE 6-continued

Sleeve Test to Clean Oil-Based North Sea Field Mud with
CaCl$_2$/CaBr$_2$ (12.2 ppg) Brine Viscosified Pill with
5 vol. % Surfactant-Solvent Blend and a Non-
viscosified Brine Pill with 5 vol. % Surfactant-Solvent
Blend at 1-minute Contact Times

| | Surfactant-Solvent Blend used | | | |
| --- | --- | --- | --- | --- |
| | Sleeve Test to clean Mineral Oil Based North Sea Field Mud | | Sleeve Test to clean Synthetic Oil Based Field Mud | |
| Name | Percentage Cleaning at 40° F. | Percentage Cleaning at 120° F. | Percentage Cleaning at 40° F. | Percentage Cleaning at 120° F. |
| Formulation C | 93 | 90 | 100 | 100 |
| Formulation D | 96 | 99 | 94 | 91 |

The results above show >95% cleaning efficiency with the use of the brine-based viscosified pills containing a surfactant-solvent blend at low and high temperatures, which means that these brine-based viscosified pills are suitable for wellbore cleaning and fluid displacement in onshore, offshore, and deep-water applications.

In the foregoing specification, the invention has been described with reference to specific embodiments thereof. However, it will be evident that various modifications and changes can be made thereto without departing from the broader spirit or scope of the invention as set forth in any appended claims. Accordingly, the specification is to be regarded in an illustrative rather than a restrictive sense. For example, fluids, brines, surfactants, solvents, co-solvents, polyglycerol esters, viscosifiers, blends, components, chemistries, formulations, proportions, methods for cleaning or fluid displacement or removal, and amounts not specifically identified or described in this disclosure or not evaluated in a particular Example are still expected to be within the scope of this invention.

The present invention may suitably comprise, consist or consist essentially of the elements disclosed and may be practiced in the absence of an element not disclosed. For instance, there may be provided a method for cleaning a wellbore or displacing fluid in a wellbore that comprises, consists essentially of, or consists of introducing to a wellbore a brine-based viscosified pill comprising, consisting essentially of, or consisting of a viscosified brine and a surfactant-solvent blend and no solid weighting agents in an amount effective to clean the wellbore or displace fluid in the wellbore; where the surfactant-solvent blend comprises, consists essentially of, or consists of about 5 wt. % to about 40 wt. % of at least one non-ionic surfactant, about 5 wt. % to about 20 wt. % of at least one polyglycerol ester, about 20 wt. % to about 60 wt. % of at least one co-solvent, about 20 wt. % to about 25 wt. % water, and optionally about 1 wt. % to about 15 wt. % of at least one hydrophobic solvent, where the method further comprises, consists essentially of, or consists of conducting an operation selected from the group consisting of cleaning the wellbore, displacing fluid from the wellbore, and combinations thereof.

Furthermore there may be provided a solid weighting agent-free, brine-based viscosified pill formulation for displacement or removal of a drilling fluid, the formulation comprising, consisting essentially of, or consisting of about 80 vol. % to about 95 vol. % viscosified brine; and about 5 vol. % to about 20 vol % of a surfactant-solvent blend comprising, consisting essentially of, or consisting of about 5 wt. % to about 40 wt. % of at least one non-ionic surfactant, about 5 wt. % to about 20 wt. % of at least one polyglycerol ester, about 20 wt. % to about 60 wt. % of at least one co-solvent, about 20 wt. % to about 25 wt. % water, and optionally about 1 wt. % to about 15 wt. % of at least one hydrophobic solvent where the formulation contains no solid weighting agents.

The words "comprising" and "comprises" as used throughout the claims, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. A solid weighting agent-free, brine-based viscosified pill formulation for displacement or removal of a drilling fluid, the formulation comprising:
   about 80 vol. % to about 95 vol. % viscosified brine; and
   about 5 vol. % to about 20 vol % of a surfactant-solvent blend comprising:
      about 5 wt. % to about 40 wt. % of at least one non-ionic surfactant;
      about 5 wt. % to about 20 wt. % of at least one polyglycerol ester;
      about 20 wt. % to about 60 wt. % of at least one co-solvent;
      about 20 wt. % to about 25 wt. % water; and
      about 1 wt. % to about 15 wt. % of at least one hydrophobic solvent, wherein the at least one hydrophobic solvent is an olefinic ester; and
   where the formulation contains no solid weighting agents, and does not form a microemulsion.

2. The formulation of claim 1, where the viscosified brine is a mixture of a brine having a density ranging from about 9 pounds per gallon ("ppg") to about 19.2 ppg and a viscosifier selected from a group consisting of guar gum, xanthan gum, diallyldimethylammonium chloride polymer, synthetic polymer, hydroxyethyl cellulose, viscoelastic surfactant, and combinations thereof.

3. The formulation of claim 1, where the at least one non-ionic surfactant is selected from a group consisting of alkyl poly glycosides, alcohol ethoxylates, polyglycerol alkyl ethers, polyglycols, glucosyl dialkyl ethers, ester-linked surfactants, polyoxyethylene alkyl ethers, sorbitan esters, polysorbates, surfactin, EO/PO block co-polymers, and combinations thereof.

4. The formulation of claim 1, where the co-solvent is selected from a group consisting of 2-butoxyethanol, glycol ethers, propylidene glycerol, butanol, butoxytriglycol, and combinations thereof.

* * * * *